ences Cited

(12) United States Patent
Moffatt et al.

(10) Patent No.: US 6,177,485 B1
(45) Date of Patent: Jan. 23, 2001

(54) POLYMERS DERIVED FROM UNSATURATED SURFACTANTS FOR USE IN INK-JET INKS

(75) Inventors: John R Moffatt; Joseph W Tsang, both of Corvallis, OR (US)

(73) Assignee: Hewlett-Packard Company, Palo Alto, CA (US)

(*) Notice: Under 35 U.S.C. 154(b), the term of this patent shall be extended for 0 days.

(21) Appl. No.: 09/251,947

(22) Filed: Feb. 17, 1999

(51) Int. Cl.[7] .............. C09D 11/10; C08F 26/02; C08F 28/02; C08F 220/10
(52) U.S. Cl. .......... 523/160; 524/555; 524/815; 526/287; 526/311; 526/312
(58) Field of Search ............... 523/160, 161; 106/31.27, 31.6, 31.59, 31.89; 524/555, 815; 526/287, 311, 312, 318.3

(56) References Cited

U.S. PATENT DOCUMENTS

| | | | |
|---|---|---|---|
| 2,586,238 | 2/1952 | Lytton et al. | 260/85.5 |
| 2,935,493 | * 5/1960 | Schuller et al. | 525/163 |
| 4,548,744 | 10/1985 | Connor | 252/545 |
| 5,085,698 | 2/1992 | Ma et al. | 106/20 |
| 5,116,409 | 5/1992 | Moffatt | 106/22 |
| 5,120,809 | 6/1992 | Lupo et al. | 526/306 |
| 5,133,803 | 7/1992 | Moffatt | 106/25 |
| 5,156,675 | * 10/1992 | Breton et al. | 106/31.43 |
| 5,207,824 | 5/1993 | Moffatt et al. | 106/22 R |
| 5,226,957 | 7/1993 | Wickramanayake et al. | 106/25 R |
| 5,403,906 | 4/1995 | Scriven et al. | 526/212 |
| 5,458,809 | 10/1995 | Fredj et al. | 252/542 |
| 5,458,810 | 10/1995 | Fredj et al. | 252/542 |
| 5,460,752 | 10/1995 | Fredj et al. | 252/542 |
| 5,466,802 | 11/1995 | Panandiker et al. | 544/193.2 |
| 5,470,507 | 11/1995 | Fredj et al. | 252/542 |
| 5,478,489 | 12/1995 | Fredj et al. | 252/99 |
| 5,512,089 | * 4/1996 | Thakkar | 523/122 |
| 5,531,815 | 7/1996 | Gundlach et al. | 106/20 R |
| 5,571,311 | 11/1996 | Belmont et al. | 106/20 R |
| 5,630,868 | 5/1997 | Belmont et al. | 106/31.75 |
| 5,633,225 | 5/1997 | Fredj et al. | 510/475 |
| 5,749,952 | 5/1998 | Tsang et al. | 106/31.64 |
| 5,919,293 | * 7/1999 | Moffatt et al. | 106/31.57 |
| 5,965,634 | * 10/1999 | Idogawa et al. | 523/161 |
| 6,057,384 | * 5/2000 | Nguyen et al. | 523/160 |

FOREIGN PATENT DOCUMENTS

| | | | |
|---|---|---|---|
| 0159185 | * 10/1995 | (EP) | . |
| 688836 | 12/1995 | (EP) | . |
| 408081647 | * 3/1996 | (JP) | . |
| 10251567 | * 9/1998 | (JP) | . |
| WO 96/18695 | 6/1996 | (WO) | . |
| WO 96/18696 | 6/1996 | (WO) | . |
| WO 97/48769 | 12/1997 | (WO) | . |

OTHER PUBLICATIONS

"Colour Index", the *Society of Dyers and Colourists*, Yorkshire, England, Third Edition, vol. 4 (1971).
Lewis Sr., Richard J.; Hawley's Condensed Chemical Dictionary 12th Ed., Van Nostrand Reinhold, New York (p. 357), 1993.*
English Translation of JP 408081647, 1998.*

* cited by examiner

*Primary Examiner*—Vasu Jagannathan
*Assistant Examiner*—Callie E. Shosho

(57) ABSTRACT

The properties of ink-jet inks containing a colorant (pigment, macromolecular chromophore, or dye) are improved by adding thereto an additive, specifically, one or more polymers derived from unsaturated surfactants. The unsaturated surfactant(s) has at least one carbon-carbon double bond (C=C). The polymer may be simply an polymer of the unsaturated surfactant. Alternatively, the polymer may be co-polymerized with one or more vinyl monomers or one or more polymers based on the vinyl monomers may be mixed with the unsaturated surfactant polymer. The vinyl monomer(s) or polymer(s) are used to adjust or "tweak" the properties of the resultant polymer. For example, the more hydrophobic the polymer or the higher its molecular weight, then the greater the water-fastness afforded the ink-jet ink. The polymeric additive of the invention improves bleed control, water-fastness, and smear-fastness of ink-jet inks, particularly thermal ink-jet inks.

35 Claims, No Drawings

US 6,177,485 B1

POLYMERS DERIVED FROM UNSATURATED SURFACTANTS FOR USE IN INK-JET INKS

TECHNICAL FIELD

The present relates generally to ink-jet inks, and, more particularly, to additives, specifically, polymeric additives, for improving bleed control, water-fastness, and smear-fastness of ink-jet inks.

BACKGROUND ART

Thermal ink-jet printers offer a low cost, high quality, and comparatively noise-free option to other types of printers commonly used with computers. Such printers employ a resistor element in a chamber provided with an egress for ink to enter from a plenum. The plenum connects to a reservoir for storing the ink. A plurality of such resistor elements forms a pattern in a printhead. This pattern is called a primitive. Each of the resistor elements line up with a nozzle in a nozzle plate, through which ink is expelled toward a print medium. The entire assembly of printhead and reservoir comprises an ink-jet pen.

In operation, each resistor element connects through a conductive trace to a microprocessor, where current-carrying signals cause one or more selected elements to heat. The heating creates a bubble of ink in the chamber, which is expelled through the nozzle toward the print medium. Firing a plurality of such resistor elements, in a particular order, in a given primitive, forms alphanumeric characters, performs area-fills, and provides other print capabilities on the medium.

Ink-jet inks used in thermal ink-jet printing typically comprise a colorant and a vehicle, with the vehicle often containing water and other relatively low surface tension liquids. The colorant may comprise a water-miscible dye or a water-insoluble pigment that is dispersed in the ink with a dispersing agent.

The tight tolerances of the nozzles (typically 50 mm diameter) require that the ink not clog the nozzles. Furthermore, repeated firings of the resistor elements, which must withstand about 10 million firings over the life of the ink cartridge, can result in fouling of the resistor element. Kogation is the term used for this type of fouling. The ink composition must be capable of interacting with the print medium, especially paper, to penetrate it without undue spreading. The ink composition should be smear- and water-resistant on the paper. Finally, bleed between colors must be controlled, so that any invasion of a color by another color is reduced or even eliminated.

Many inks possess one or more of the foregoing properties. However, few ink compositions posses all of those properties, since an improvement in one property often results in the degradation of another property. Thus, inks used commercially represent a compromise in an attempt to achieve an ink evidencing at least an adequate performance in each of the aforementioned properties.

Accordingly, investigations continue into developing ink formulations that have improved properties such as reduced kogation and reduced crusting (i.e. improved decap). Further properties sought to be improved include high edge acuity, high optical density, fast drying times, good water-fastness, and good smear-fastness, all without sacrificing performance in other necessary properties.

Recent advances in ink-jet inks have incorporated pigments in place of the earlier water-miscible dyes. However, pigments by definition are not water-miscible, and require the presence of a dispersing agent. Further investigations into the use of pigments have determined that surface treatment of the pigment, to form either anionic or cationic functional groups on the surface, provides a macromolecular chromophore (MMC) that is water-soluble, thus eliminating the requirement for a dispersing agent.

Investigation continues into the use of pigments that have been treated to be water-miscible, but which possess most, if not all, of the foregoing desired properties. Further, there continues to be a need for inks that employ water-miscible dyes where it is desired to also improve the foregoing properties.

DISCLOSURE OF INVENTION

In accordance with the invention, the properties of ink-jet inks containing a colorant (pigment, macromolecular chromophore, or dye) are improved by adding thereto an additive, specifically, one or more polymers derived from unsaturated surfactants. The unsaturated surfactant(s) has at least one carbon-carbon double bond (C=C). The polymer may be simply an polymer of the unsaturated surfactant. Alternatively, the polymer may be co-polymerized with one or more vinyl monomers or one or more polymers based on the vinyl monomers may be mixed with the unsaturated surfactant polymer. As used herein, the term "copolymer" is used to include polymers derived from co-polymerizing two or more monomers as well as mixtures of polymers. The vinyl monomer(s) or polymer(s) is used to adjust or "tweak" the properties of the resultant polymer. For example, the more hydrophobic the polymer or the higher its molecular weight, then the greater the water-fastness afforded the ink-jet ink.

The additive of the invention improves bleed control, water-fastness, and smear-fastness of ink-jet inks, particularly thermal ink-jet inks.

BEST MODES FOR CARRYING OUT THE INVENTION

The use of polymers derived from unsaturated surfactants unexpectedly improves several properties of ink-jet inks, whether the colorant is a water-insoluble pigment or a water-miscible dye. The unsaturated surfactants employed in the practice of the present invention have at least one carbon-carbon double bond (C=C) and are selected from the group consisting of (1) unsaturated zwitterionic surfactants, including unsaturated amines oxides, unsaturated betaines, and unsaturated betaine sulfonates, (2) unsaturated cationic surfactants, and (3) unsaturated fatty acids.

The polymerization is conveniently performed by free radical polymerization in water, using an initiator. Specific examples are described below as to the monomer, the initiator, and its concentration.

1. Polymerization of OOAO and Other Amine Oxides

OOAO (N,N-diinethyl-N-(z-9-octadecenyl)-N-amine oxide) is an example of an unsaturated zwitterionic surfactant. This compound has previously been disclosed and claimed for its substantial effect in bleed control; see, e.g., U.S. Pat. No. 5,116,409, issued on May 26, 1992, to John R. Moffatt and assigned to the same assignee as the present invention.

The inventors found that OOAO polymerizes in water with radical initiators, presumably by the following pathway:

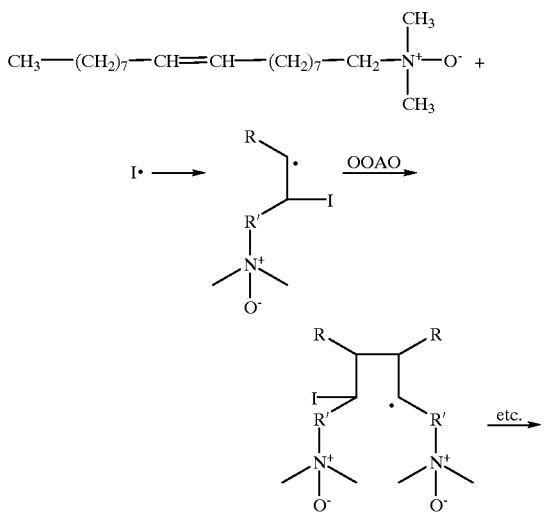

where I• is an initiator.

For example, a 2% solution of OOAO in water showed a marked reduction of viscosity (about one order of magnitude) upon addition of 0.2 g of $K_2S_2O_8$ at temperature >80° C. with stirring for 5 minutes. In water, the monomeric amphiphiles form micelles at low concentrations, but at higher concentrations (and consequently higher viscosities), they probably form lamellar sheets.

Examples of initiators useful in the practice of the present invention include the sodium ($Na^+$), potassium ($K^+$), and ammonium ($NH_4^+$) salts of persulfate ($S_2O_8^{-2}$). In addition, the following azo compounds may be used as initiators:

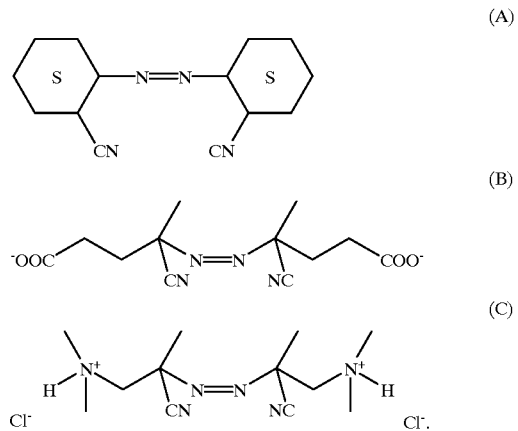

These compounds are also known as 1,1'-azobis (cyclohexanecarbonitrile) (A), 4,4'-azo(4-cyanovaleric acid) (B), and 2,2'-azobis(2-methylpropionamidine) dihydrochloride (C), respectively. Examples of other initiators also useful in the practice of the present invention include 2,2'-azobisisobutyronitrile and 2,2'-azobis[2(2-imidazoline 2-yl) propane] dihydrochloride.

The amount of initiator is in the range of about 0.01 to 1.5 wt %, relative to the total monomer/water solution. The amount of monomer in solution is typically about 2 wt %, so that at the upper range of initiator concentration, the ratio of initiator to monomer is nearly 1:1.

Amine oxide surfactants are of interest in thermal ink-jet printing due to well-known properties of stability, water-fastness in macromolecular chromophores (MMCs), and bleed control. They are frequently mild toward pen materials, including the barrier layer. They can render carboxylated macromolecular complexes water-fast. It is anticipated that oligomers composed of their surfactants should behave equally well or superior to their monomeric counterparts.

The amine oxide surfactants employed in the practice of the present invention are represented by the general formula:

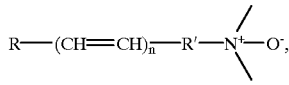

where R is an alkyl chain and R' is a methylene chain, each independently having from having 1 to 20 carbon atoms and n is an integer from 1 to 20.

In addition to OOAO, examples of other amine oxides useful in the practice of the present invention include N,N-dimethyl-N-hexadecenyl-N-amine oxide, N,N-dimethyl-N-tetradecenyl-N-amine oxide, N,N-dimethyl-N-dodecenyl-N-amine oxide, and N,N-dimethyl-N-decenyl-N-amine oxide.

Included within the scope of the present invention are the structures predicted from molecular dynamics simulations of the dimer and trimer structures composed of OOAO monomer. These show that even these small oligomers have micelle mimic properties in that the hydrophobic groups are clustered in the interior and the water-soluble amine oxide N-O polar moiety is out towards the bulk water environment. It is possible to see that these types of molecules can very easily form shells around the pigment particles, such as Pigment Red 122 (Color Index No. 73915) or Pigment Yellow 74 (Color Index No. 11741) or macromolecular chromophores such as CaboJet 300 and others. The above-referenced pigments are commercially available from, e.g., Sun Chemical (Cincinnati, Ohio). Macromolecular chromophores are disclosed and claimed, for example, in U.S. Pat. Nos. 5,749,952; 5,571,311; and 5,630,868, in PCT published applications WO 96/18695, WO 96/18696, WO 97/48769, and in EP published application EP 688836A.

Treatment of OOAO at 2% by weight in water with 0.2% by weight $Na_2S_2O_8$ have particle sizes of 152 nm and viscosity of 0.93 cps, whereas OOAO treated under identical fashion except with 0.2% by weight $Na_2SO_4$, instead of $Na_2S_2O_8$, has particle size of 60 nm. This strongly suggests that OOAO polymerizes to small oligomers under these conditions.

It is expected that hydrophobic character, ease of polymerization and self-solubilization of OOAO and other amine oxides will be useful in polymers of ink-jet inks. For example, other monomers may be incorporated into the amine oxide polymerization process to enhance the performance of the resulting polymer. Such other monomers are vinyl monomers, including acrylate, methacrylate, and vinyl ethers. Specific examples of such monomers include:

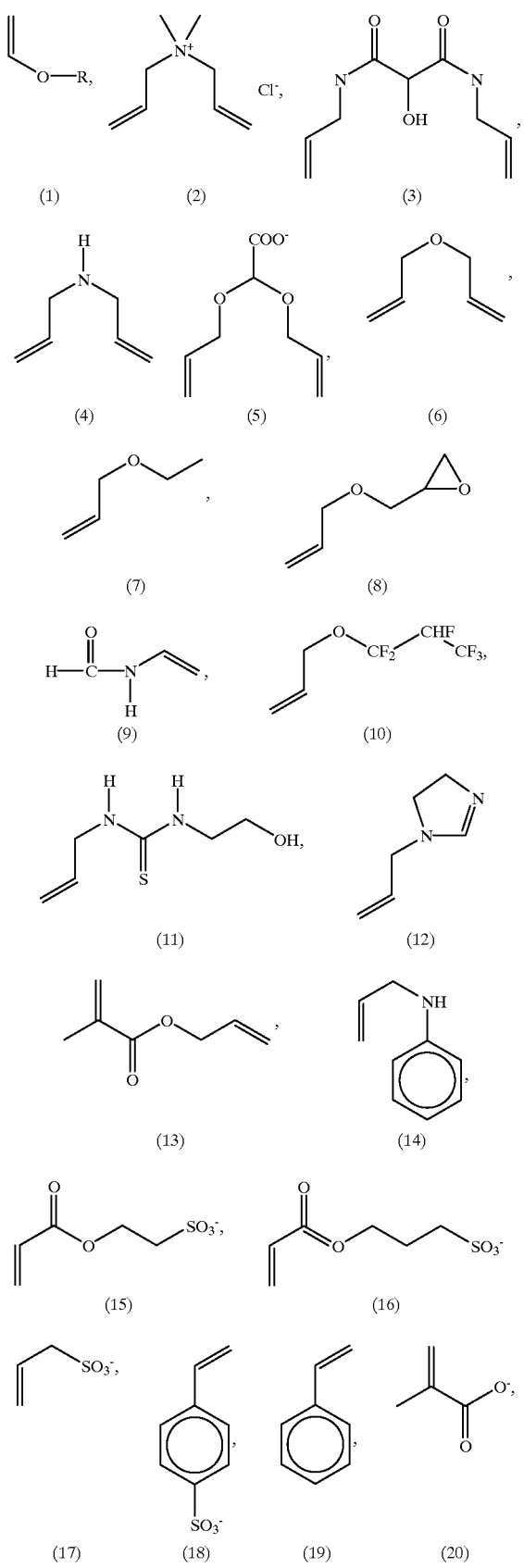

-continued

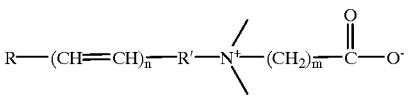

(21)

The names of the foregoing compounds are as follows:

| NUMBER | NAME |
|---|---|
| 1 | alkyl vinyl ether |
| 2 | dimethyl diallyl ammonium chloride |
| 3 | bis-(N-allyl)hydroxy malonamide |
| 4 | diallyl amine |
| 5 | 2,2-diallyl ethanoic acid acetal |
| 6 | diallyl ether |
| 7 | ethyl alkyl ether |
| 8 | allyl glycidyl ether |
| 9 | N-vinylformamide |
| 10 | allyl-(1,1,2,3,3,3-hexafluoropropyl)ether |
| 11 | N-allyl-N-2-hydroxyethyl thiourea |
| 12 | 3-imidazole propene |
| 13 | allyl methacrylate |
| 14 | allyl phenylamine |
| 15 | 2-sulfoethyl acrylate |
| 16 | 3-sulfopropylacrylate |
| 17 | 3-sulfopropene |
| 18 | styrene sulfonate |
| 19 | styrene |
| 20 | methacrylate |
| 21 | N-(3,3-dimethyl-3-sulfopropyl)-N-(3-propyl ammonium hydrochloride) methacrylate |

The polymer additive(s) may be polymerized without or with one or more of the vinyl monomers. The amount of vinyl monomer in the polymeric additive is in the range of 0 to about 99 wt % of the total polymer.

2. Polymerization of Other Monomers

In addition to the use of amine oxides as described above, the following monomers may be used either with the above-described amine oxides or in place thereof. These monomers include:

(1) unsaturated betaines:

$$R-(CH=CH)_{\overline{n}}-R'-N^+-(CH_2)_{\overline{m}}-C-O^-$$

where R, R', and n are as defined above and where m is an integer ranging from 1 to 20 and preferably about 3. Examples of unsaturated betaines useful in the practice of the present invention include N,N-dimethyl-N-(4-z-dodecenyl)-N-ammonioethane carboxylate, N,N-dimethyl-N-tetradecenyl-N-ammonioethane carboxylate, N,N-dimethyl-N-hexadecenyl-N-ammonioethane carboxylate, N,N-dimethyl-N-octadecenyl)-N-ammonioethane carboxylate, and N,N-dimethyl-N-decenyl-N-ammonioethane carboxylate.

(2) unsaturated betaine sulfonates:

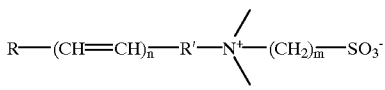

where R, R', n, and m are as defined above. Examples of unsaturated betaine sulfonates useful in the practice of the present invention include N,N-dimethyl-N-(4-z-dodecenyl)-N-ammoniopropane sulfonate, N,N-dimethyl-N-tetradecenyl-N-ammonio-propane sulfonate, N,N-dimethyl-N-hexadecenyl-N-ammoniopropane sulfonate, N,N-dimethyl-N-octadecenyl)-N-ammoniopropane sulfonate, and N,N-dimethyl-N-decenyl-N-ammoniopropane sulfonate.

(3) unsaturated fatty acids:

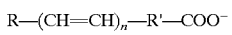

where R, R', and n are as defined above. Examples of unsaturated fatty acids useful in the practice of the present invention include palmiteolate, oleate, lineolate, linolenate, ricineladate, and ricinolenate.

(4) unsaturated cationic surfactants:

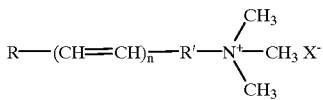

where R, R', and n are as defined above and $X^-$ is a counterion, such as $Cl^-$, $Br^-$, $I^-$, tosylate, phosphate, sulfate, or mesylate. Examples of unsaturated cationic surfactants useful in the practice of the present invention include N,N,N-trimethyl-N-(z-octadecenyl)ammonium chloride, N,N,N-trimethyl-N-hexadecenyl ammonium chloride, N,N,N-trimethyl-N-tetradecenyl ammonium chloride, N,N,N-trimethyl-N-dodecenyl ammonium chloride, and N,N,N-trimethyl-N-decenyl ammonium chloride.

As with the amine oxides, the monomers are polymerized by a free radical polymerization in water, again, using the same initiators disclosed above. These monomers may also be copolymerized with one or more of the vinyl monomers listed above, in the same concentration range as given above.

The inventors have found that smear-fastness performance against alkaline and acid high-lighters is improved by addition of these small oligomers in CaboJet 300, which is a chemically-modified carbon black pigment available from Cabot Corp. For example, an ink composed of 4 wt % CaboJet 300, 8 wt % glycerol, 8 wt % 1,5-pentanediol and 1 wt % of OOAO oligomer improved smear by 33% as compared to an ink without the oligomer. The smear-fastness appeared after heating and pressing the print sample for 1 to 3 seconds at 190° C. 100% water-fastness was observed after 3 minutes of drying time.

Thus, it is expected that OOAO polymerization or other zwitterionic surfactants with alkene groups will enhance the smear-fastness, water-fastness, and bleed control, serviceability by themselves or when incorporated into other co-polymers composed of vinyl monomers, such as acrylates, methacrylates, and vinyl ethers, used in thermal ink-jet inks. Copolymerization of OOAO and other unsaturated surfactants with vinyl polymers will enable a fusing process analogous to that used in laser printing. In essence, fuser technology is a post-printing treatment wherein the printed page is heated above the polymer's glass transition temperature (Td for a short duration. Thereby, the matrix consists of the polymer, colorants, and the media, physically fused as one.

3. Inks Employing the Foregoing Polymeric Additives

As with other ink-jet inks, the inks of the present invention comprise a vehicle and a colorant. The polymeric additive described above is added to the ink to provide a water-fast and smear-fast ink in which bleed is controlled.

The concentration of the polymeric additive of the invention is in the range of about 0.25 to 15 wt %, and preferably in the range of about 0.5 to 8 wt %, of the total ink composition.

In addition to the above-mentioned polymeric additive, various other additives are included in the ink, as is well-known in the art. Such additional additives are employed to optimize the properties of the ink for specific applications. For example, as is well-known to those skilled in the art, biocides may be used in the ink composition to inhibit growth of microorganisms, sequestering agents such as EDTA may be included to eliminate deleterious effects of heavy metal impurities, and buffer solutions may be used to control the pH of the ink. Other known additives such as viscosity modifiers and other acrylic or non-acrylic polymers may be added to improve various properties of the ink compositions as desired. Such additives typically comprise up to about 5 wt % of the ink. The purity of all components is that normally employed in conventional commercial practice of formulating ink-jet inks.

The colorant comprises either one or more pigments or one or more dyes. If pigments are employed, either a dispersant is used or the pigments are chemically modified. Dispersants used in conjunction with pigments are disclosed, for example, in U.S. Pat. No. 5,085,698 to S. -H. Ma et al. Chemical modification of pigments is disclosed and claimed, for example, in application Ser. No. 08/955,477, filed Oct. 2, 1997, and application Ser. No. 08/958,948, filed Oct. 28, 1997 [PD-10970695-1].

If a pigment is employed as the colorant, one or more of the following pigments are useful in the practice of the invention; however, this listing is not intended to limit the invention. The following pigments are available from BASF: Paliogen® Orange, Heliogen® Blue L 6901F, Heliogen® Blue NBD 7010, Heliogen® Blue K 7090, Heliogen® Blue L 7101F, Paliogen® Blue L 6470, Heliogen® Green K 8683, and Heliogen® Green L 9140. The following pigments are available from Cabot: Monarch® 1400, Monarch® 1300, Monarch® 1100, Monarch® 1000, Monarch® 900, Monarch® 880, Monarch® 800, and Monarch® 700. The following pigments are available from Ciba-Geigy: Chromophtal® Yellow 3G, Chromophtal® Yellow GR, Chromophtal® Yellow 8G, Igrazin® Yellow SGT, Igralite® Rubine 4BL, Monastrals Magenta, Monastral® Scarlet, Monastral® Violet R, Monastral® Red B, and Monastral® Violet Maroon B. The following pigments are available from Columbian: Raven 7000, Raven 5750, Raven 5250, Raven 5000, and Raven 3500. The following pigments are available from Degussa: Color Black FW 200, Color Black FW 2, Color Black FW 2V, Color Black FW 1, Color Black FW 18, Color Black S 160, Color Black S 170, Special Black 6, Special Black 5, Special Black 4A, Special Black 4, Printex U, Printex V, Printex 140U, and Printex 140V. The following pigment is available from DuPont: Tipure® R-101. The following pigments are available from Heubach: Dalamar® Yellow YT-858-D and Heucophthal® Blue G XBT-583D. The following pigments are available from Hoechst: Permanent Yellow GR, Permanent Yellow G, Permanent Yellow DHG, Permanent Yellow NCG-71, Permanent Yellow GG, Hansa Yellow RA, Hansa Brilliant Yellow 5GX-02, Hansa Yellow-X, Novoperm® Yellow HR, Novoperm® Yellow FGL, Hansa Brilliant Yellow 10GX, Permanent Yellow G3R-01, Hostaperm® Yellow H4G, Hostaperm® Yellow H3G, Hostaperm® Orange GR, Hostaperm® Scarlet GO, and Permanent Rubine F6B. The following pigments are available from Mobay: Quindo® Magenta, Indofast® Brilliant Scarlet, Quindo® Red R6700, Quindo® Red R6713, and Indofast® Violet. The following pigments are available from Sun Chemical: L74-1357 Yellow, L75-1331 Yellow, L75-2577 Yellow, YGD 9374 Yellow, YHD 9123 Yellow, YCD 9296 Yellow, YFD 1100 Yellow, QHD6040 Magenta, QFD1180 Magenta, RFD3217 Magenta, QFD1 146 Magenta, RFD9364 Magenta, QFD 9334 Magenta, BCD6105 Cyan, BCD9448 Cyan, BCD6060 Cyan, BFD5002 Cyan, BFD1I21 Cyan, and LHD9303 Black.

Examples of macromolecular chromophores include Cabojet 200 and Cabojet 300, which are available from Cabot Corporation (Billerica, Mass.), and Microjet Black CW, which is available from Orient Chemical (Osaka, Japan). Reference is also made to the above-listed patents regarding MMCs (U.S. Pat. Nos. 5,749,952; 5,571,311; 5,630,868 and PCT published applications WO 96/18695, WO 96/18696, WO 97/48769, and in EP published application EP 688836A, listed above.

If a dye is employed, one or more of the following dyes are useful in the practice of the present invention; however, this listing is not intended to limit the invention: nitroso (CI Numbers 10000–10299), nitro (CI Numbers 10300–10999), monoazo (CI Numbers 11000–19999), disazo (CI Numbers 20000–29999), trisazo (CI Numbers 30000–34999), polyazo (CI Numbers 35000–36999), azoic (CI Numbers 37000–39999), stilbene (CI Numbers 40000–40799), carotenoid (CI Numbers 40800–40999), diphenylmethane (CI Numbers 41000–41999), triarylmethane (CI Numbers 42000–44999), xanthene (CI Numbers 45000–45999), acridine (CI Numbers 46000–46999), quinoline (CI Numbers 47000–47999), methine and polymethine (CI Numbers 48000–48999), thiazole (CI Numbers 49000–49399), indamine and indophenol (CI Numbers 49400–49999), azine (CI Numbers 50000–50999), oxazine (CI Numbers 51000–51999), thiazine (CI Numbers 52000–52999), sulfur (CI Numbers 53000–54999), lactone (CI Numbers 55000–55999), aminoketone (CI Numbers 56000–56999), hydroxyketone (CI Numbers 57000–57999), anthraquinone (CI Numbers 58000–72999), Indigoid (CI Numbers 73000–73999), phthalocyanine (CI Numbers 74000–74999), natural organic coloring matters (CI Numbers 75000–75999), oxidation bases (CI Numbers 76000–76999), and inorganic coloring matters (CI Numbers 77000–77999). The foregoing dyes are listed in the Color Index, Vol. 4, 3$^{rd}$ Ed., published by the Society of Dyers and Colorists, Yorkshire, England (1971).

The concentration of the colorant is in the range of about 0.01 to 8 wt % of the ink, and preferably in the range of about 0.01 to 3 wt %, of the total ink composition.

The vehicle comprises one or more co-solvents and water. The co-solvents comprise one or more organic, water-miscible solvents commonly employed in ink-jet printing. Classes of co-solvents employed in the practice of this invention include, but are not limited to, aliphatic alcohols, aromatic alcohols, diols, glycol ethers, poly(glycol) ethers, caprolactams, formamides, acetamides, and long chain alcohols. Examples of compounds employed in the practice of this invention include, but are not limited to, primary aliphatic alcohols of 30 carbons or less, primary aromatic alcohols of 30 carbons or less, secondary aliphatic alcohols of 30 carbons or less, secondary aromatic alcohols of 30 carbons or less, 1,2-alcohols of 30 carbons or less, 1,3-alcohols of 30 carbons or less, 1,ω-alcohols of 30 carbons or less, ethylene glycol alkyl ethers, propylene glycol alkyl ethers, poly(ethylene glycol) alkyl ethers, higher homologs of poly(ethylene glycol) alkyl ethers, poly(propylene glycol) alkyl ethers, higher homologs of poly(propylene glycol) alkyl ethers, N-alkyl caprolactams, unsubstituted caprolactams, substituted formamides, unsubstituted formamides, substituted acetamides, and unsubstituted acetamides. Specific examples of co-solvents that are preferably employed in the practice of this invention include, but are not limited to, N-methyl pyrrolidone, 1,5-pentanediol, 2-pyrrolidone, diethylene glycol, 1,3-(2-methyl)-propanediol, 1,3,5-(2-methyl)-pentanetriol, tetramethylene sulfone, 3-methoxy-3-methylbutanol, glycerol, and 1,2-alkyldiols.

The concentration of the co-solvent is in the range of about 0.01 to 30 wt % of the ink, and preferably in the range of about 1 to 15 wt %, of the total ink composition.

The balance of the ink formulation comprises water.

INDUSTRIAL APPLICABILITY

The inks containing polymeric additives formed from unsaturated amine oxides, unsaturated fatty acids, betaine sulfonates, and unsaturated cationic surfactants are expected to find use in ink-jet inks for improving water-fastness, smear-fastness, and bleed control.

Thus, there has been disclosed an ink for ink-jet printing that includes specific polymeric additives. It will be readily apparent to those skilled in the art that various changes and modifications of an obvious nature may be made, and all such changes and modifications are considered to fall within the scope of the appended claims.

What is claimed is:

1. An ink-jet ink for ink-jet printing comprising a colorant and a vehicle, said ink-jet ink further comprising a polymeric additive comprising at least one polymer derived from an unsaturated surfactant selected from the group consisting of unsaturated zwitterionic surfactants, unsaturated fatty acids, and unsaturated cationic surfactants, said unsaturated surfactant having at least one carbon-carbon double bond.

2. The ink-jet ink of claim 1 wherein said unsaturated zwitterionic surfactant is selected from the group consisting of unsaturated amine oxides, unsaturated betaines, and unsaturated betaine sulfonates.

3. The ink-jet ink of claim 2 wherein said unsaturated amine oxide is given by the formula

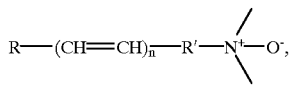

where R is an alkyl chain and R' is a methylene chain, each independently having from 1 to 20 carbon atoms and n is an integer from 1 to 20.

4. The ink-jet ink of claim 3 wherein said unsaturated amine oxide is selected from the group consisting of N,N-dimethyl-N-(z-9-octadecenyl)-N-amine oxide, N,N-dimethyl-N-hexadecenyl-N-amine oxide, N,N-dimethyl-N-tetradecenyl-N-amine oxide, N,N-dimethyl-N-dodecenyl-N-amine oxide, and N,N-dimethyl-N-decenyl-N-amine oxide.

5. The ink-jet ink of claim 2 wherein said unsaturated betaine is given by the formula

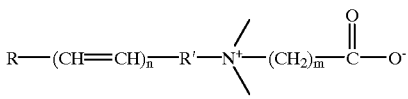

where R is an alkyl chain and R' is a methylene chain, each independently having from 1 to 20 carbon atoms, n is an integer from 1 to 20, and m is an integer ranging from 1 to 20.

6. The ink-jet ink of claim 5 wherein said unsaturated betaine is selected from the group consisting of N,N-dimethyl-N-(4-z-dodecenyl)-N-ammonioethane carboxylate, N,N-dimethyl-N-tetradecenyl-N-ammonioethane carboxylate, N,N-dimethyl-N-hexadecenyl-N-ammonioethane carboxylate, N,N-dimethyl-N-octadecenyl)-N-ammonioethane carboxylate, and N,N-dimethyl-N-decenyl-N-ammonioethane carboxylate.

7. The ink-jet ink of claim 2 wherein said unsaturated betaine sulfonate is given by the formula

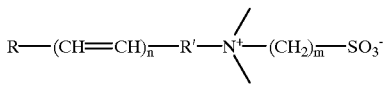

where R is an alkyl chain and R' is a methylene chain, each independently having from 1 to 20 carbon atoms and n is an integer from 1 to 20 and m is an integer from 1 to 20.

8. The ink-jet ink of claim 7 wherein said unsaturated betaine sulfonate is selected from the group consisting of N,N-dimethyl-N-(4-z-dodecenyl)-N-ammoniopropane sulfonate, N,N-dimethyl-N-tetradecenyl-N-ammoniopropane sulfonate, N,N-dimethyl-N-hexadecenyl-N-ammoniopropane sulfonate, N,N-dimethyl-N-octadecenyl)-N-ammoniopropane sulfonate, and N,N-dimethyl-N-decenyl-N-ammoniopropane sulfonate.

9. The ink-jet ink of claim 1 wherein said unsaturated fatty acid is given by the formula

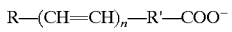

where R is an alkyl chain and R' is a methylene chain, each independently having from 1 to 20 carbon atoms and n is an integer from 1 to 20.

10. The ink-jet ink of claim 9 wherein said unsaturated fatty acid is selected from the group consisting of pahmiteolate, oleate, lineolate, linolenate, ricineladate, and ricinolenate.

11. The ink-jet ink of claim 1 wherein said unsaturated cationic surfactant is given by the formula

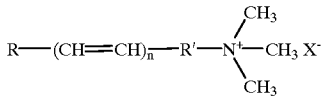

where R is an alkyl chain and R' is a methylene chain, each independently having from 1 to 20 carbon atoms, n is an integer from 1 to 20, and X is a counterion selected from the group consisting of Cl⁻, Br⁻, I⁻, tosylate, phosphate, sulfate, and mesylate.

12. The ink-jet ink of claim 11 wherein said unsaturated cationic surfactant is selected from the group consisting of N,N,N-trimethyl-N-(z-octadecenyl)ammonium chloride, N,N,N-trimethyl-N-hexadecenyl ammonium chloride, N,N,N-trimethyl-N-tetradecenyl ammonium chloride, N,N,N-trimethyl-N-dodecenyl ammonium chloride, and N,N,N-trimethyl-N-decenyl ammonium chloride.

13. The ink-jet ink of claim 1 wherein said polymeric additive is present in said ink in a concentration within a range of about 0.25 to 15 wt % of said ink-jet ink.

14. The ink-jet ink of claim 13 wherein said concentration is within a range of about 0.5 to 8 wt % of said ink-jet ink.

15. The ink-jet ink of claim 1 wherein said polymeric additive further includes at least one vinyl monomer, in an amount of 0 to about 99 wt % of said polymeric additive.

16. The ink-jet ink of claim 15 wherein said at least one vinyl monomer is selected from the group consisting of acrylates, methacrylates, and vinyl ethers.

17. A method of improving water-fastness, smear-fastness, and bleed control of an ink-jet ink comprising a colorant and a vehicle, said method comprising adding an effective amount of a polymeric additive to said ink-jet ink, said polymeric additive comprising at least one polymer derived from an unsaturated surfactant selected from the group consisting of unsaturated zwitterionic surfactants, unsaturated fatty acids, and unsaturated cationic surfactants, said unsaturated surfactant having at least one carbon-carbon double bond.

18. The method of claim 17 wherein said unsaturated zwitterionic surfactant is selected from the group consisting of unsaturated amine oxides, unsaturated betaines, and unsaturated betaine sulfonates.

19. The method of claim 18 wherein said unsaturated amine oxide is given by the formula

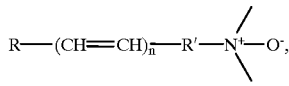

where R is an alkyl chain and R' is a methylene chain, each independently having from 1 to 20 carbon atoms and n is an integer from 1 to 20.

20. The method of claim 19 wherein said amine oxide is selected from the group consisting of N,N-dimethyl-N-(z-9-octadecenyl)-N-amine oxide, N,N-dimethyl-N-hexadecenyl-N-amine oxide, N,N-dimethyl-N-tetradecenyl-N-amine oxide, N,N-di-methyl-N-dodecenyl-N-amine oxide, and N,N-dimethyl-N-decenyl-N-amine oxide.

21. The method of claim 18 wherein said unsaturated betaine is given by the formula

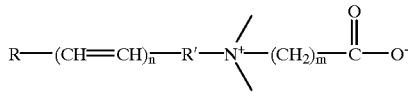

where R is an alkyl chain and R' is a methylene chain, independently having from 1 to 20 carbon atoms, n is an integer from 1 to 20, and m is an integer ranging from 1 to 20.

22. The method of claim 21 wherein said unsaturated betaine is selected from the group consisting of N,N-dimethyl-N-(4-z-dodecenyl)-N-ammonioethane carboxylate, N,N-dimethyl-N-tetradecenyl-N-ammonioethane carboxylate, N,N-dimethyl-N-hexadecenyl-N-ammonioethane carboxylate, N,N-dimethyl-N-octadecenyl)-N-ammonioethane carboxylate, and N,N-dimethyl-N-decenyl-N-ammonioethane carboxylate.

23. The method of claim 22 wherein said unsaturated betaine sulfonate is selected from the group consisting of N,N-dimethyl-N-(4-z-dodecenyl)-N-ammoniopropane sulfonate, N,N-dimethyl-N-tetradecenyl-N-ammoniopropane sulfonate, N,N-dimethyl-N-hexadecenyl-N-ammoniopropane sulfonate, N,N-dimethyl-N-octadecenyl)-N-ammoniopropane sulfonate, and N,N-dimethyl-N-decenyl-N-ammoniopropane sulfonate.

24. The method of claim 18 wherein said unsaturated betaine sulfonate is given by the formula

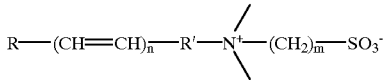

where R is an alkyl chain and R' is a methylene chain, each independently having from 1 to 20 carbon atoms and n is an integer from 1 to 20 and m is an integer from 1 to 20.

25. The method of claim 17 wherein said unsaturated fatty acid is given by the formula

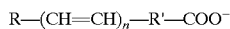

where R is an alkyl chain and R' is a methylene chain, each independently having from 1 to 20 carbon atoms and n is an integer from 1 to 20.

26. The method of claim 25 wherein said unsaturated fatty acid is selected from the group consisting of palmiteolate, oleate, lineolate, linolenate, ricineladate, and ricinolenate.

27. The method of claim 17 wherein said unsaturated cationic surfactant is given by the formula

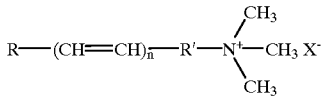

where R is an alkyl chain and R' is a methylene chain, each independently having from 1 to 20 carbon atoms, n is an integer from 1 to 20, and X is a counterion selected from the group consisting of $Cl^-$, $Br^-$, $I^-$, tosylate, phosphate, sulfate, and mesylate.

28. The method of claim 27 wherein said unsaturated cationic surfactant is selected from the group consisting of N,N,N-trimethyl-N-(z-octadecenyl)ammonium chloride, N,N,N-trimethyl-N-hexadecenyl ammonium chloride, N,N,N-trimethyl-N-tetradecenyl ammonium chloride, N,N,N-trimethyl-N-dodecenyl ammonium chloride, and N,N,N-trimethyl-N-decenyl ammonium chloride.

29. The method of claim 17 wherein said polymeric additive is present in said ink in a concentration within a range of about 0.25 to 15 wt % of said ink-jet ink.

30. The method of claim 29 wherein said concentration is within a range of about 0.5 to 8 wt % of said ink-jet ink.

31. The method of claim 17 wherein said polymeric additive further includes at least one vinyl monomer, in an amount of 0 to about 99 wt % of said polymeric additive.

32. The method of claim 31 wherein said at least one vinyl monomer is selected from the group consisting of acrylates, methacrylates, and vinyl ethers.

33. The method of claim 17 wherein said polymeric additive is formed by free radical polymerization of a monomer of said unsaturated surfactant.

34. The method of claim 33 wherein said polymerization is carried out in the presence of an initiator selected from the group consisting of the sodium, potassium, and ammonium salts of persulfate and azo compounds.

35. The method of claim 34 wherein said initiator is added in an amount within a range of about 0.01 to 1.5 wt % of a solution of said monomer.

* * * * *